Patented Apr. 26, 1932

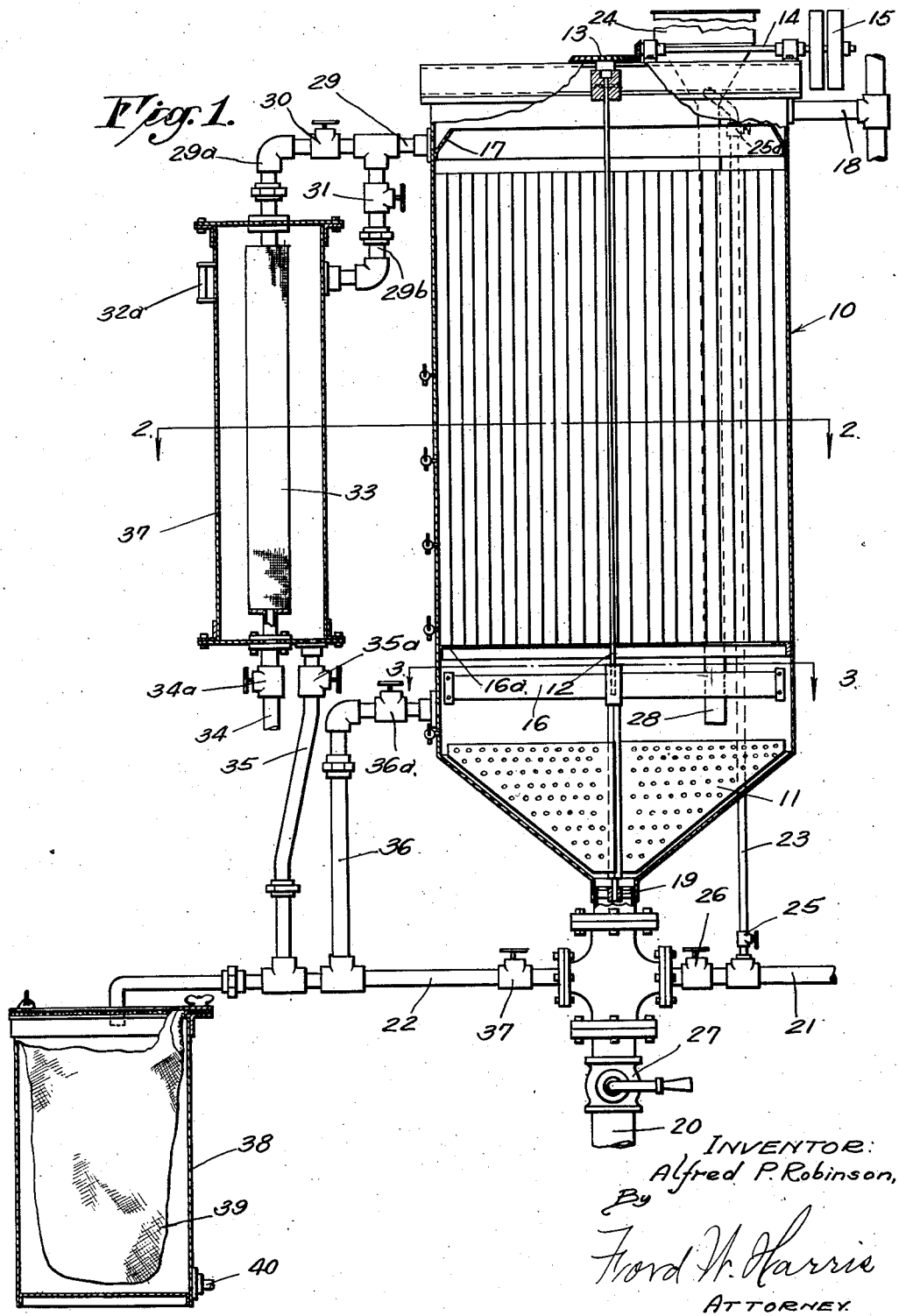

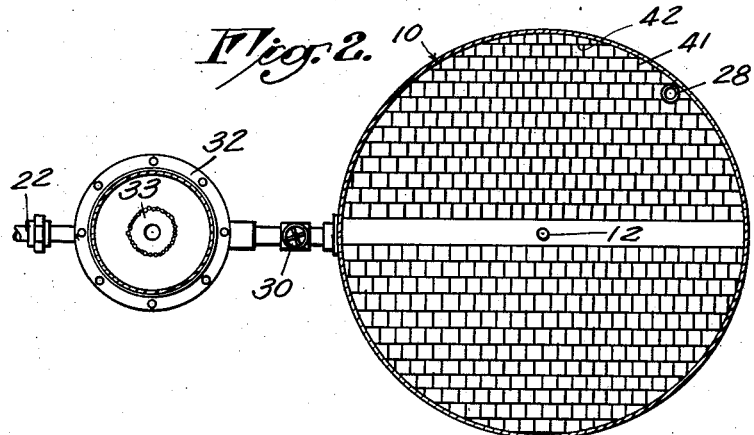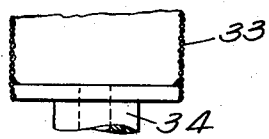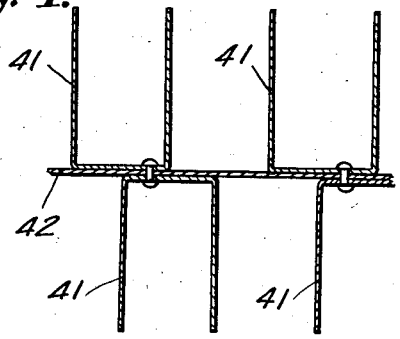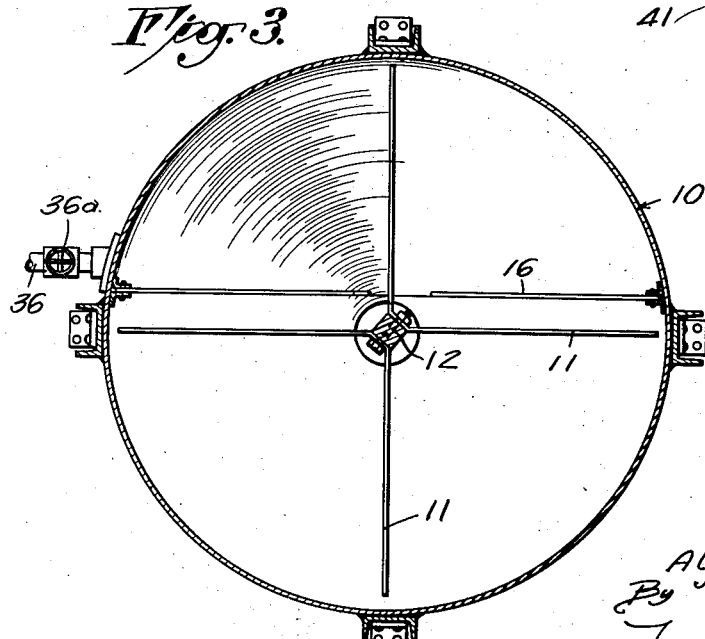

1,855,610

UNITED STATES PATENT OFFICE

ALFRED P. ROBINSON, OF LOS ANGELES, CALIFORNIA, ASSIGNOR, BY MESNE ASSIGNMENTS, TO FILTROL COMPANY OF CALIFORNIA, OF LOS ANGELES, CALIFORNIA, A CORPORATION OF CALIFORNIA

CONTINUOUS OPERATION APPARATUS FOR PURIFYING LIQUIDS

Application filed May 7, 1928. Serial No. 275,783.

This invention relates to an apparatus intended especially for purifying gasoline which has been used in dry-cleaning operations. Its use is, however, not limited to such liquid, but may embrace the purification of raw gasoline in process of manufacture, kerosene, lubricating oils, spent oils, such as crank case oil, and many other liquids of entirely different nature such as colored sugar solutions.

One object of the invention is to provide an apparatus and method whereby such a liquid may be purified in a practically continuous manner without the use of large amounts of acids, alkalies or other strong chemicals.

Another object is to provide an apparatus that will accomplish good filtration and clarification; which may be cleaned in a very short period of time and emptied of liquid quickly in case of fire.

Another object is to provide an apparatus in which the agitation of the liquid with the adsorbent and the settling of the latter from the liquid are accomplished within the same tank.

Referring to the accompanying drawings:

Fig. 1 shows a side elevation in section of the apparatus.

Fig. 2 shows a cross-section taken on the line 2—2 of Fig. 1.

Fig. 3 shows a cross-section taken on the line 3—3 of Fig. 1.

Fig. 4 is an enlarged detail view of the honeycomb structure shown at 42 in Fig. 2.

Fig. 5 shows the lower end of the strainer denoted by 33 in Fig. 1.

The apparatus comprises a large conical bottomed tank 10, provided with a perforated agitator and the conventional shaft and bevel gears 12 and 13, for driving it. The gears are in turn driven by a shaft 14 from tight and loose pulleys 15. Above the agitator, which is shaped to conform to the conical bottom of the tank, there is a strip or bar 16 extending diametrically across the tank edge up, and firmly held on each end. Its purpose is to break up the wave caused by the motion of the agitator in order to prevent turbulence higher in the tank.

The middle portion which occupies, roughly, two-thirds of the tank, is made up of sections of the kind shown in Fig. 4 and at 42 in Fig. 2. These are deep flat sections and may be made by fastening 2" x 2½" channel-irons 41 on flat rectangles of sheet metal 42, as shown in Fig. 4. The sections are held vertically in the tank and rest upon an interior ledge or ring 16ᵈ forming a large number of deep narrow vertical channels.

The middle portion extends upward to a point somewhat below a coaming 17 which has the form of a short truncated cone having a wide opening therethrough. It is adapted to act as an overflow dam. The top of the tank 10 is covered but is provided with an overflow pipe 18 at its highest point.

The conical bottom of the tank is provided with a bearing 19 for the agitator shaft. Although the bearing is within the bottom outlet of the tank, it is of such a type as not to obstruct the flow of liquid through said outlet.

Below the bearing is coupled a large outlet pipe 20 provided with a quick opening valve 27 so that the contents of the tank may be quickly run into an underground storage tank in case of fire. There are two smaller pipes 21 and 22 entering the pipe 20 from the side. 21 is the liquid inlet and is provided with a by-pass pipe 23 to a covered hopper 24 at the top of the main tank. Valves 25 and 25ᵃ in the by-pass line serve to control the flow of liquid in the by-pass line. The top valve is for convenience of operation from a platform, not shown. A valve 26 in the line 21 serves as a main solvent shut-off. There is a valve 37 in the pipe 22 near the outlet pipe 20.

From the reservoir 24, a pipe 28, of considerable width, extends down into the main tank to a point just clear of the agitator.

From the top of the tank 10 at a point just below pipe 18 a branched overflow pipe 29 is led off, the branches being designated by 29ᵃ and 29ᵇ. Both are provided with valves 30 and 31 and both lead to a filtering chamber 32. Within the chamber 32 is a filtering cylinder 33 made of metal gauze, preferably of Monel metal cloth of 150 mesh. The pipe 29ᵃ enters the interior of the filtering cylinder from the top while 29$^b$ enters the chamber 32 from the side.

There are two exit pipes from the chamber 32, numbered 34 and 35, provided with valves 34$^a$ and 35$^a$ respectively. The pipe 34 leads to the clean solvent storage tank while the pipe 35 connects with the pipe 22. Another pipe 36, having a valve 36$^a$ connects with the pipe 22 from a point in the main tank a little above the agitator. 32$^a$ is a liquid level sight gauge.

The pipe 22 connects with the top of a filtering chamber (sludge filter) 38 which contains a filtering bag 39 and has a bottom outlet 40.

The mode of operation is as follows:

The agitator is started and dirty solvent, such as gasoline which has been used in dry cleaning, is admitted to the tank 10 from the bottom through the line 21, the valve 26 being open and the valves 25, 27 and 37 closed. The valve 26 is closed and a suitable quantity of powdered, acid-activated clay, preferably the kind known as "Filtrolene" is placed in the reservoir 24. "Filtrolene" is made by a process of activating clay with sulphuric acid very similar to that described in United States Patent 1,397,113 to P. W. Prutzman. The by-pass valves 25 and 25$^a$ are then opened to admit solvent into the reservoir 24 and wash down into the tank 10 any clay which has not already fallen down the pipe 28. Enough solvent and clay are now in the bottom of the tank to bring the liquid level to the bottom of the honeycomb structure. The agitator is then slowly revolved so as to intimately mix the clay with the liquid to decolorize and otherwise purify it. After a period of agitation long enough to complete the adsorbent action, either another charge of solvent and adsorbent as large as the first is run in, or preferably, the valve 26 is left open such an amount as will continuously feed solvent at the same rate it is purified and run off into clean solvent storage. In consequence, the preceding content of solvent which is purified but still contains the purifying agent, is lifted up by displacement into the honeycomb structure.

There it loses whatever turbulence it had. Under the influence of absence of motion, the clay has a chance to settle out of the solvent and does so quickly and continuously. The result is that the rising solvent near the top of the honeycomb structure is free of clay and overflows the coaming 17 continuously into the pipe 29. The coaming assists in separating the liquid from clay which may have been carried past the honeycomb structure.

The valves 30 and 35$^a$ are normally closed during such operation and the valves 31 and 34$^a$ are left open. The solvent therefore continuously enters the chamber 32 from the side and finds its way through the gauze 33, leaving its last traces of solid matter thereon. It then passes to the clean solvent storage tank through the pipe 34.

The gauze 33, of course, needs periodic cleaning, which is easily accomplished by reversing the flow of liquid in the chamber 32. To do so, the valves 31, 34$^a$ and 35$^a$ are closed and the valve 30 opened. Solvent is allowed to flow in a reverse direction through the gauze until the chamber 32 is full, which point may be judged by means of a sight glass 32$^a$, then the valve 35$^a$ is opened and the dirty liquid allowed to drain into the chamber 38 and filter through the bag 39.

Likewise the cone bottom of the main tank accumulates spent clay and must be cleaned. To do so a preliminary period of rest is first given the agitator, then the valve 36$^a$ is opened to permit the supernatant clear solvent to drain through the pipe 36 into the filter chamber 38. The valve 36$^a$ is then closed and the valve 37 opened and the remaining clay and solvent (sludge) run through the pipe 22 into the filter chamber 38. The filtered liquid may be recovered at the bottom outlet 40.

Various modifications of the apparatus and method are possible, as will be understood by those skilled in the art. The tank 10 may, for instance, be provided with a steam jacket to heat viscous liquids undergoing treatment, or may be provided with a reflux condenser for especially volatile ones. A slight amount of sulphuric acid may be added with the clay, since decolorization proceeds better under acid conditions.

For most purposes continuous operation is preferred but it is obvious that my apparatus and method may also be adapted to a batch process.

I claim as my invention:

1. In an apparatus of the character described, a closed mixing and separating tank comprising a lower portion containing an agitator, a middle portion containing a multiplicity of long vertical narrow cells, an upper portion containing an overflow coaming and a means for introducing a powder and a liquid into the lower portion of the tank, and a means for continuously removing liquid from the top of the tank.

2. In a clarifying and decolorizing apparatus for use on liquids, an agitating tank having long narrow vertical cells of comparatively small cross-sectional area in its middle portion, a decanting coaming at its top, an inlet pipe and an outlet pipe, a powder-admitting pipe, and a by-pass permitting introduction of liquid into the powder-admitting means from the inlet pipe.

In testimony whereof, I have hereunto set my hand, at Los Angeles, California, this 20th day of April, 1928.

ALFRED P. ROBINSON.